United States Patent [19]
Klauminzer

[11] 4,016,504
[45] Apr. 5, 1977

[54] OPTICAL BEAM EXPANDER FOR DYE LASER

[75] Inventor: Gary K. Klauminzer, Palo Alto, Calif.

[73] Assignee: Molectron Corporation, Sunnyvale, Calif.

[22] Filed: Apr. 12, 1976

[21] Appl. No.: 676,233

[52] U.S. Cl. .................... 331/94.5 C; 350/286
[51] Int. Cl.² .......................................... H01S 3/08
[58] Field of Search ............... 331/94.5; 330/4.3; 350/286

[56] References Cited
UNITED STATES PATENTS

| | | | |
|---|---|---|---|
| 3,508,166 | 4/1970 | Simmons et al. | 331/94.5 C |
| 3,609,590 | 9/1971 | Jernigan | 331/94.5 C |
| 3,735,283 | 5/1973 | Wuerker et al. | 331/94.5 C |

Primary Examiner—William L. Sikes
Attorney, Agent, or Firm—Boone, Schatzel, Hamrick & Knudsen

[57] ABSTRACT

A multiple prism beam expander for use in dye lasers and the like comprising two or more prisms positioned relative to each other and between a dye cell and diffraction grating such that laser light from the dye cell is passed through first one of the prisms and then another with at least two of the prisms serving to magnify the incident light beam in the plane of refraction common to both prisms.

14 Claims, 3 Drawing Figures

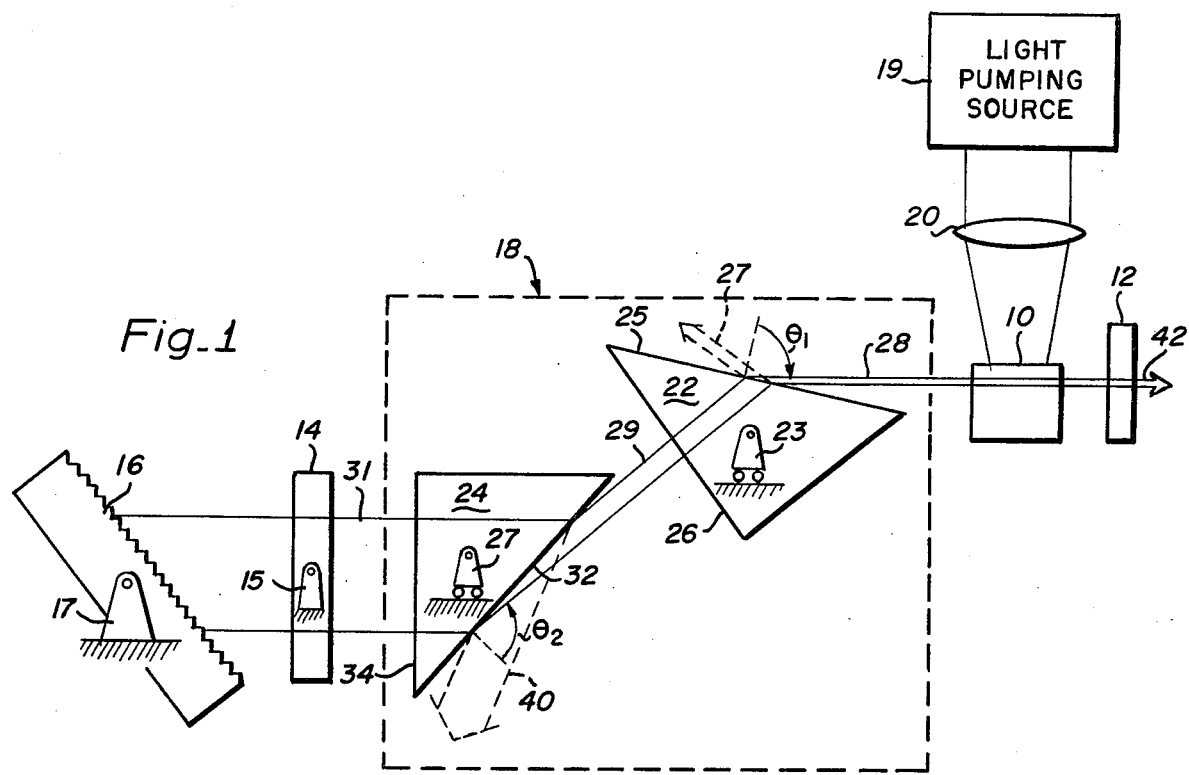
Fig_1
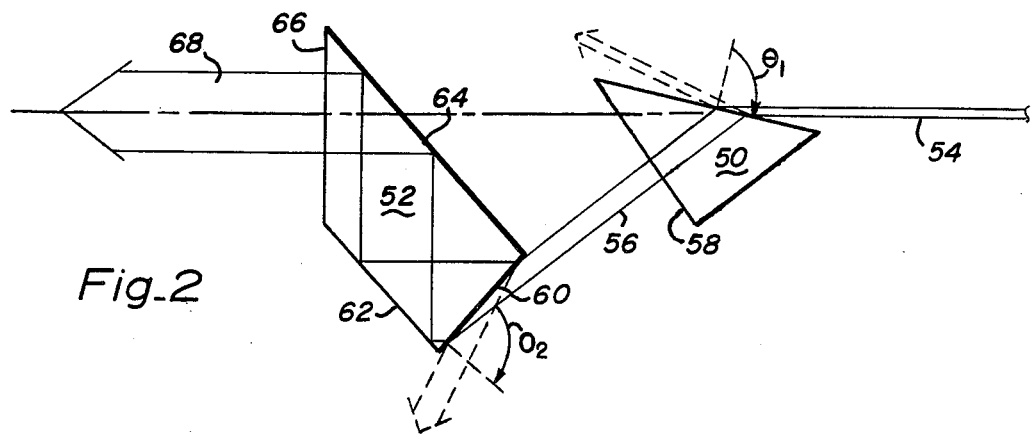
Fig_2
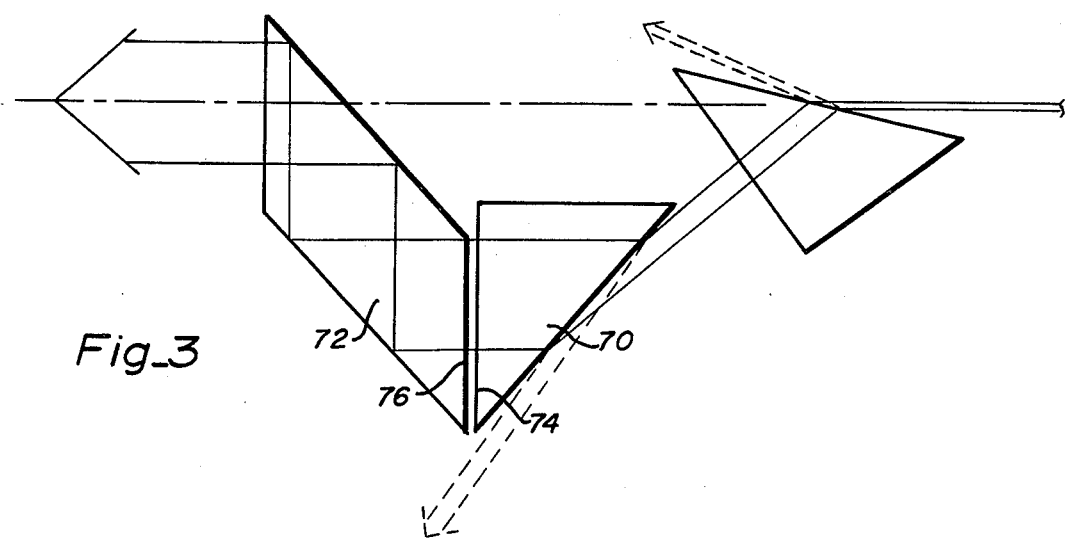
Fig_3

OPTICAL BEAM EXPANDER FOR DYE LASER

BACKGROUND OF THE INVENTION

1. Field of the Invention

The present invention relates generally to optical light beam expander apparatus and more particularly to a multiple-prism light beam expander system having particular applicability for use in dye lasers to narrow the bandwidth of the output laser beam.

2. Description of the Prior Art

A simple dye laser includes an optically pumped dye cell with a diffraction grating disposed on one side of the cell and an output mirror disposed on the other side. The diffraction grating is used as the wavelength selection device and permits the laser wavelength to be tuned within the fluorescence band of the particular dye used. While the output power of this basic type of dye laser is excellent, the linewidth is relatively poor because the cross sectional area of the beam cast onto the diffraction grating is small. To improve (i.e., reduce) the linewidth, some type of beam expanding device is usually inserted between the dye cell and the grating to expand the laser beam on the grating.

A telescope expander developed by Hansch was the first beam expander breakthrough and has been used as the classical design since it was disclosed in *Applied Optics*, Volume 11, pp. 895–898, in April of 1972. Such apparatus is, however, subject to the disadvantages that it is expensive, it has relatively poor beam quality due to imperfect, small radius-of-curvature spherical surfaces, it adds significantly to the cavity length, it does not permit variation of the beam expansion, it expands the beam in two dimensions so that the intracavity etalon must be large and of extremely high quality, and the grating rotation mechanism must be extremely precise so that the grating grooves remain orthogonal to the laser axis as the grating rotates.

Two single-prism designs disclosed by Stokes et al in *Optics Communications*, Volume 5, No. 4, Page 267, July of 1972, and Hanna et al in *Optical and Quantum Electronics* 7 (1975), 115–119, have also been used with varying degrees of success to overcome the deficiencies of the telescope expander. However, neither has been satisfactory in that overcoming some of the deficiencies of the telescope has invariably introduced others. For example, these types of expanders are not achromatic, they must sacrifice power or tuning range in order to increase expansion (to reduce laser linewidth), they do not produce an output beam that is completely polarized, and they are not colinear with the optical cavity and thereby make alignment of the system difficult.

Another prior art dye laser structure using a cylindrical lens beam expanding system is disclosed in the U.S. Pat. to Itzkan et al, No. 3,868,590.

SUMMARY OF THE PRESENT INVENTION

It is therefore a principal object of the present invention to provide an optical beam-expander system for use in dye lasers which overcomes the deficiencies of other prior art beam-expanding devices.

Briefly, the present invention is comprised of two or more prisms positioned relative to each other and between a dye cell and diffraction grating such that light from the dye cell is passed through first one of the prisms and then another with at least two of the prisms serving to magnify the incident light beam in the plane of refraction common to both prisms.

As will be discussed in more detail below the present invention has the advantages that it is relatively inexpensive, is achromatic in that the expanded output beam can be made parallel to the unexpanded input beam for all wavelengths, provides variable beam expansion, is easy to align, provides good beam quality, and does not require the use of a polarizer.

These and other objects and advantages of the present invention will no doubt become apparent to those skilled in the art after having read the following detailed description of the preferred embodiments which are illustrated in the drawing.

IN THE DRAWING

FIG. 1 is a schematic diagram illustrating a dye laser including an optical expander system in accordance with the present invention;

FIG. 2 is a schematic digram illustrating an alternative embodiment of an optical expander system in accordance with the present invention; and FIG. 3 is a schematic diagram illustrating an additional alternative embodiment of an optical expander system in accordance with the present invention.

DETAILED DESCRIPTION OF THE PREFERRED EMBODIMENTS

Referring now to FIG. 1 of the drawing there is shown a dye laser including a dye cell 10, a partially reflective mirror 12, an etalon 14, a diffraction grating 16, and a dual-prism beam expander 18. An optical cavity is formed between mirror 18 and grating 16 with the dye cell 10, beam expander 18 and etalon 14 defining an optical axis.

The dye cell 10 is generally comprised of a container filled with laseable material such as an organic dye and including optical windows as its end faces. In order to induce stimulated emission of radiation, the dye material within the container is excited by a beam of light from a light pumping source illustrated schematically at 19. The pumping beam is focused onto dye cell 10 through an aspheric focusing lens 20. The beam expander 18 is comprised of a pair of prisms 22 and 24 positioned so as to refract and expand light from dye cell 10 as illustrated.

In the preferred embodiment, the dye cell is a Molectron model DL051 Cuvette Dye Cell made of fused silica. The output coupling mirror 12 is an uncoated fused silica substrate with a 30 minute wedge between surfaces to avoid reflections into the cavity from the surface facing away from the cavity. The etalon is a Molectron model DL026 Intracavity Etalon made of fused silica, 3mm thick with a di-electric reflection coating on both surfaces. Diffraction grating 16 is a Bausch % Lomb model 35-63-06-460 having 600 grooves per mm and a blaze angle of 54°, 6'.

The dual prism assembly 18 is comprised of the two prisms 22 and 24 having hypotenuse dimensions of 21mm for prism 22 and 26 mm for prism 24. The material for both prisms is BX-7 glass and typical orientation angles are $\theta_1 = \theta_2 = 80°$ giving a total magnification of approximately twenty. The light pumping source is a Molectron model UV-1000 nitrogen laser, and the focusing lens 20 is a Molectron model DL015 Aspheric Focusing Lens made of fused silica. The total cavity length from mirror 12 to grating 16 is 180mm.

Prism 22 is positioned to have its entrance face 25 angularly facing dye cell 10 so that laser radiation, illustrated by the lines 28, from cell 10 will be incident upon face 25 at an angle $\theta_1$. The incident beam will be both reflected as indicated by the dashed arrow 27 and refracted through prism 22 as indicated at 29 to emerge therefrom at an angle close to orthogonal relative to the prism exit face 26. Note that in passing through prism 22 the laser beam 28 is expanded in the plane of the drawing to form a broader beam 29. The beam expansion M in the plane of refraction is given by the expression $$M = \left[ \frac{1 - (\sin^2\theta_1)/n_i^2}{1 - \sin^2\theta_1} \right]^{1/2}$$

where $n_i$ is the refractive index of the prism 22 at the laser wavelength, and $\theta_1$ is the incidence angle.

Although the choice of prism material is not critical, some care in the choice thereof may be necessary to insure adequate transmission at all possible lasing wavelengths. The prism should also be placed as close as possible to the cell 10 so that the laser cavity is kept as short as possible and the beam size w at the prism is nearly the same as the waist size $w_0$ in the cell. The width Mw of the expanded beam 29 as it leaves the prism is then essentially the same as the waist size $Mw_0$.

The beam expander 18 also includes a second prism 24 having a beam entrance face 32 and a beam exit face 34. Prism 24 is positioned so as to have its entrance face 32 intercepted by beam 29 at an angle of incidence of $\theta_2$ and its exit face 34 facing etalon 14. As with prism 22, the incident beam 29 will be both reflected, as indicated by the dashed arrow 40, and reflected through the prism 24 to emerge as indicated at 31 at an angle close to orthogonal relative to the prism exit face 34.

In passing through prism 24 the laser beam 29 is expanded as in prism 22; thus the total expansion of the beam expander 18 is a product of the expansion of the individual prisms 22 and 24. Note however, that by carefully selecting and positioning the two prisms, the expanded beam 31 will be parallel to the laser beam 28 incident on prism 22 and that furthermore, any dispersion effects caused by prism 22 are cancelled by equal but opposite dispersion effects in prism 24. The total expansion through the dual prism expander 18 is therefore achromatic in that the exit beam is parallel to the input beam while the expansion through either prism 22 or 24 separately is not achromatic.

To provide for variation in the total expansion factor of prism assembly 18 while maintaining the parallel relationship between input and output beams, prisms 22 and 24 are mounted so that they can be rotated and translated as schematically illustrated at 23 and 27 to increase or decrease the angles of incidence $\theta_1$ and $\theta_2$. Upon exiting from prism 24 the expanded beam 31 is then passed through etalon 14 to the grooved face of diffraction grating 16 both of which function in a manner identical to that in the design of Hansch; that is, the grating selects particular wavelengths within the fluorescence range of the dye while the etalon narrows the linewidth beyond that achieved with only the grating and beam expander. Both the etalon and grating are mounted as schematically illustrated at 15 and 17 so that they can be rotated to change the wavelength.

In accordance with the present invention the prisms need not be right angle prisms but the angle between the entrance and exit faces should be approximately 45°, i.e., that found in common right angle prisms. Moreover, for the achromatic property of the dual prism design, both prisms must have the same angle between the entrance and exit faces referred to above, and $\theta_1$ must equal $\theta_2$. Although variation in the total expansion factor can be achieved as described above, in practice it is expected that a fixed expansion factor will be selected for a particular model laser. However, other models may use the same prisms and possibly the same holder assembly but have a different expansion factor. In accordance with the embodiments described above, the total expansion factor is in the range of 20–30, far in excess of that which can be reasonably achieved with the single prism.

In operation, the pumping laser 19, flashlamp or other source emits a pulse of radiation which is incident upon the dye in cell 10. In the particular case of a pulsed nitrogen laser pump, lens 20 focuses the pumping beam to a line just inside the outer surface of the dye cell 10 and lying along the axis of the optical cavity. This pumping radiation excites the molecules of the dye material to higher energy levels to provide the population inversion necessary for stimulated emission to occur in the laser material. The resulting emission by the laser material is then passed through beam expander 18 and etalon 14, and then onto the face of grating 16 where only light of a particular wavelength is returned back along the optical axis of the cavity. In passing back through the optical system the selected wavelength beam is contracted in width by the prisms 22 and 24 so that the returning beam at cell 10 is substantially the same width as the waist size $w_0$ of the cell 10. The output beam 42 then passes through mirror 12.

For those applications where it is necessary to have a colinear optical axis throughout the system a combination of prisms such as is illustrated in FIG. 2 may be used in place of the expander 18 shown in FIG. 1. In this alternative embodiment the first prism 50 operates exactly as does prism 22 of expander 18 but the second prism 52 is modified to include two internal reflecting faces 62 and 64 to bring the beam 68 back into line with the optical axis of beam 54. Surface 66 then becomes the output surface analogous to surface 34 of expander 18 in FIG. 1. Prism 52 can be either a single prism as shown in FIG. 2 or as a still further alternative can be comprised of two separate prisms 70 and 72 as shown in FIG. 3 of the drawing. The faces 74 and 76 may be either in optical contact or slightly separated.

In practice the prism expander performs the same functions as the telescope expander in the Hansch design in that it expands the beam on the grating in the plane of refraction thereby reducing the beam divergence onto the grating by the expansion factor and illuminating more lines on the grating; both effects serving to reduce the linewidth of the laser output beam. In addition, it produces an expanded beam which is parallel to the input beam for all wavelengths. This is important when selecting the grating wavelength with, for example, a mechanical sine drive, since the operation of the sine drive depends on a fixed beam direction onto the grating, i.e., one that does not change with wavelength.

The present expander offers performance superior to the telescope in that it is less expensive, it does not require a focus adjustment, and alignment is not as critical in that beam motion along an axis perpendicular to the plane of the drawing does not upset performance as it would for a telescope which is constrained along both axes perpendicular to the laser axis. Moreover, the expander is much shorter than a telescope of comparable expansion capability and optical quality, and thus improves dye laser efficiency for a given pumping pulse duration. In addition, the constraints on the grating rotation mechanism are less severe since the divergence of the beam at the grating is not reduced along the axis perpendicular to the plane of FIG. 1. Hence the grating is permitted a larger amount of tilt as it rotates before cavity alignment is upset. Tilt is defined as grating motion about an axis parallel to that axis defined by the intersection of the plane of the grating and the plane of FIG. 1, and grating rotation is defined as motion about an axis parallel to the grooves of the grating surface which are themselves perpendicular to the plane of FIG. 1.

The constraints on the optical quality of etalon 14 are also reduced by the present invention since the beam illuminates a smaller area of the etalon as a result of expansion in only one axis rather than two axes as in the case of the telescope. It will also be appreciated that expansion of the beam can be varied to suit a particular requirement by rotating and translating the prisms. In accordance with the present invention the output beam is polarized in the plane of FIG. 1 without the need for a separate polarizing element, and excellent output beam quality is more readily achieved since there are no surfaces having a small radius of curvature as in the telescope.

Compared to the single prism designs of Stokes et al and Hanna et al, the dual expander of the present invention has the advantage that the output beam to the grating is fixed in direction regardless of wavelength and is in fact parallel to the input beam. In addition, the multiple prism expander provides better polarization of the output beam. Furthermore, as compared to the Stokes design, the present multiple prism expander offers higher magnification at a lower angle of incidence thus reducing losses and improving efficiency. As compared to the design of Hanna et al in which the output beam is taken off the reflection from the prism input surface, the present multiple prism expansion results in a broader tuning range for each dye and avoids the superradiant background emission present in the Hanna design at low gain, particularly at the extremes of a dye tuning range.

Although the present invention has been described above with relation to several preferred embodiments, it is appreciated that certain alterations and modifications of the apparatus disclosed will no doubt become apparent to those skilled in the art after having read this disclosure. It is therefore intended that the appended claims be interpreted as covering all such alterations and modifications as fall within the true spirit and scope of the invention.

What is claimed is:

1. In a dye laser apparatus including a pair of spaced apart reflectors defining an optical cavity having a dye cell and a beam expander disposed within said cavity, and a light pumping source for optically exciting the dye to a lasing condition, an improved beam expander comprising:
    a first prism having a first input surface aligned with the optical axis of the dye cell and inclined at an incidence angle of $\theta_1$ relative thereto, and a first output surface angularly related to said first input surface such that lies nearly orthogonal to light refracted from a laser beam directed along said optical axis; and
    a second prism having a second input surface lying along the line of said refracted light and oriented at an incidence angle of $\theta_2$ relative thereto, and a second output surface angularly related to said second input surface such that lies nearly orthogonal to light refracted from the beam of refracted light incident on said second input surface, whereby the width of the beam of light refracted from said second input surface is expanded relative to the beam incident on the first input surface in the plane of refraction by a factor of $M_1 \times M_2$ where $$M_1 = \left[ \frac{1 - (\sin^2\theta_1)/n_1^2}{1 - \sin^2\theta_1} \right]^{1/2}$$

and $$M_2 = \left[ \frac{1 - (\sin^2\theta_2)/n_2^2}{1 - \sin^2\theta_2} \right]^{1/2}$$

and where $n_1$ and $n_2$ are respectively the refractive indexes of said first and second prisms.

2. In a dye laser apparatus as recited in claim 1 wherein said first and second prisms are both right angle prisms.

3. In a dye laser apparatus as recited in claim 1 wherein said second prism is a trapezoidal prism having third and fourth surfaces which internally reflect the beam of light refracted by said second input surface.

4. In a dye laser apparatus as recited in claim 1 and further comprising a third prism which is an oblique rectangular prism having a third input surface disposed parallel to said second output surface, a third output surface lying parallel to said third input surface and fourth and fifth surfaces which internally reflect the beam of light input to said third prism from said second prism and cause the reflected beam to exit said third output surface along a line colinear with the optical axis of said dye cell.

5. In a dye laser apparatus as recited in claim 1 wherein the incidence angles $\theta_1$ and $\theta_2$ are equal.

6. In a dye laser apparatus as recited in claim 1 and further comprising mounting means which allow said first and second prisms to be both rotated and translated relative to each other.

7. In a dye laser apparatus as recited in claim 1 wherein said second prism is oriented such that the resulting refraction and dispersion cancel that introduced by said first prism thereby causing the beam output therefrom to be parallel to the beam input to said first prism.

8. A multiple prism beam expander for use in dye laser apparatus and the like comprising:
    a first prism having a first input surface for alignment with the optical axis of the laser and inclined at an incidence angle of $\theta_1$ relative thereto, and a first output surface angularly related to said first input surface such that it lies substantially orthogonal to light refracted from a laser beam directed along said optical axis; and
    a second prism having a second input surface lying along the line of said refracted light and oriented at an incidence angle of $\theta_2$ relative thereto, and a second output surface angularly related to said second input surface such that it lies substantially orthogonal to light refracted from the beam of refracted light incident on said second input surface, whereby the width of the beam of light refracted from said second input surface is expanded in the plane of refraction.

9. A multiple prism beam expander as recited in claim 8 wherein said first and second prisms are both right angle prisms.

10. A multiple prism beam expander as recited in claim 9 and further comprising a third prism which is an oblique rectangular prism having a third input surface disposed parallel to said second output surface, a third output surface lying parallel to said third input surface and fourth and fifth surfaces which internally reflect the beam of light input to said third prism from said second prism and cause the reflected beam to exit said third output surface along a line colinear with the optical axis of said dye cell.

11. A multiple prism beam expander as recited in claim 8 wherein said second prism is a trapezoidal prism having third and fourth surfaces which internally reflect the beam of light refracted by said second input surface.

12. A multiple prism beam expander as recited in claim 8 wherein the incidence angles $\theta_1$ and $\theta_2$ are equal.

13. A multiple prism beam expander as recited in claim 8 and further comprising mounting means which allow said first and second prisms to be both rotated and translated relative to each other.

14. A multiple prism beam expander as recited in claim 8 wherein said second prism is oriented such that the resulting refraction and dispersion cancel that introduced by said first prism thereby causing the beam output therefrom to be parallel to the beam input to said first prism.

* * * * *